(12) United States Patent
Hill et al.

(10) Patent No.: US 11,104,841 B2
(45) Date of Patent: Aug. 31, 2021

(54) FRACKING PROPPANT AND METHOD OF MANUFACTURE

(71) Applicant: Dynamic Material Systems LLC, Oviedo, FL (US)

(72) Inventors: Arnold Hill, Orlando, FL (US); William Easter, Chuluota, FL (US)

(73) Assignee: Dynamic Material Systems LLC, Oviedo, FL (US)

( * ) Notice: Subject to any disclaimer, the term of this patent is extended or adjusted under 35 U.S.C. 154(b) by 205 days.

(21) Appl. No.: 16/324,843

(22) PCT Filed: Aug. 11, 2017

(86) PCT No.: PCT/US2017/046559
§ 371 (c)(1),
(2) Date: Feb. 11, 2019

(87) PCT Pub. No.: WO2018/031915
PCT Pub. Date: Feb. 15, 2018

(65) Prior Publication Data
US 2019/0169491 A1    Jun. 6, 2019

Related U.S. Application Data

(60) Provisional application No. 62/373,678, filed on Aug. 11, 2016.

(51) Int. Cl.
| | | |
|---|---|---|
| *C09K 8/80* | (2006.01) | |
| *E21B 43/267* | (2006.01) | |
| *C04B 35/622* | (2006.01) | |
| *C04B 35/626* | (2006.01) | |
| *C04B 35/528* | (2006.01) | |

(52) U.S. Cl.
CPC ............ *C09K 8/805* (2013.01); *C04B 35/528* (2013.01); *C04B 35/62204* (2013.01); *C04B 35/62272* (2013.01); *C04B 35/62655* (2013.01); *C09K 8/80* (2013.01); *E21B 43/267* (2013.01); *C04B 2235/3826* (2013.01); *C04B 2235/3895* (2013.01); *C04B 2235/483* (2013.01); *C04B 2235/486* (2013.01); *C04B 2235/5248* (2013.01); *C04B 2235/5284* (2013.01); *C04B 2235/5288* (2013.01); *C04B 2235/5296* (2013.01); *C04B 2235/5427* (2013.01); *C04B 2235/5436* (2013.01); *C04B 2235/6562* (2013.01); *C04B 2235/6586* (2013.01); *C04B 2235/77* (2013.01); *C04B 2235/80* (2013.01); *C04B 2235/94* (2013.01); *C04B 2235/96* (2013.01); *C09K 2208/08* (2013.01); *C09K 2208/10* (2013.01)

(58) Field of Classification Search
CPC ...... C09K 8/805; C09K 8/80; C09K 2208/08; C09K 2208/10; E21B 43/267; C04B 35/62272; C04B 35/62204; C04B 35/62655; C04B 35/528; C04B 2235/6562; C04B 2235/3826; C04B 2235/483; C04B 2235/5436; C04B 2235/5284; C04B 2235/5427; C04B 2235/5248; C04B 2235/80; C04B 2235/3895; C04B 2235/5288; C04B 2235/5296; C04B 2235/96; C04B 2235/77; C04B 2235/94; C04B 2235/6586; C04B 2235/486
See application file for complete search history.

(56) References Cited

U.S. PATENT DOCUMENTS

| | | | | |
|---|---|---|---|---|
| 4,547,468 A | * | 10/1985 | Jones ................ | C04B 35/111 166/280.2 |
| 8,961,840 B1 | | 2/2015 | Hill et al. | |
| 2008/0053657 A1 | * | 3/2008 | Alary ................ | C04B 35/111 166/280.2 |
| 2008/0135245 A1 | * | 6/2008 | Smith ............... | C04B 35/62886 166/280.2 |
| 2012/0114550 A1 | * | 5/2012 | Bahattab ............ | B82Y 30/00 423/447.1 |
| 2014/0323364 A1 | * | 10/2014 | Sherwood .......... | C09K 8/588 507/219 |

FOREIGN PATENT DOCUMENTS

| | | | |
|---|---|---|---|
| CN | 103992786 | * | 8/2014 |
| CN | 103992786 A | | 8/2014 |
| GB | 2520018 | * | 5/2015 |
| GB | 2520018 A | | 5/2015 |

OTHER PUBLICATIONS

Bowen, Coal Characteristics, 2008.*
Enrico Bernardo et al., Advanced Ceramics from Preceramic Polymers Modified at the Nano-Scal: A Review, Materials 2014, 7, 1927-1956.

* cited by examiner

*Primary Examiner* — Kumar R Bhushan
(74) *Attorney, Agent, or Firm* — Christopher Paradies; Paradies Law P.A.

(57) ABSTRACT

A material useful as a proppant comprises a core chemically reacted in situ from coal dust and a polymer derived ceramic material, such that at least a portion of the coal dust is chemically converted to a ceramic, nanoparticles, graphene, nanofibers or combinations of any of these.

23 Claims, 4 Drawing Sheets

FRACKING PROPPANT AND METHOD OF MANUFACTURE

CROSS RELATED APPLICATION

This application is a 371 U.S. national phase application of International Application PCT/US2017/046559 filed Aug. 11, 2017 which claims priority to U.S. Provisional Appl. No. 62/373,678, which was filed on Aug. 11, 2016, which is hereby incorporated by reference in its entirety.

FIELD OF THE INVENTION

The field relates to proppants used in fracking.

BACKGROUND

U.S. Pat. No. 8,961,840, the disclosure of which is incorporated by reference herein in its entirety, discloses a process of making spherical ceramic particles utilizing a process that dries particles formed from a polymer selected to form a ceramic when pyrolyzed. These ceramic particles are referred to as polymer derived ceramic particles.

A proppant is a solid material, typically sand, treated sand or man-made ceramic materials, designed to keep an induced hydraulic fracture open, during or following a fracturing treatment. The proppant must resist crushing and must have sufficient permeability through or around the proppant particles for extraction of gas. Proppants must allow gas under high pressure to escape through interstitial spaces between particles. There is a tradeoff between size of interstitial spaces and strength. Proppants must have sufficient mechanical strength to withstand closure stresses in order to hold fractures open after fracturing fluid is withdrawn and pressure released. While large proppant particle sizes have greater permeability than smaller particle sizes, at low closure stresses, higher closer stresses cause proppants with large particle sizes to fail mechanically. Crushing produces very fine particulates, called fines, at high closure stresses. Smaller particle size for proppants is preferred for higher closure stresses. Sand, ceramics and sintered bauxite particles are known to have been used as proppants, and there are benefits and disadvantages using any of the known proppants. ISO 13503-2:2006 is a standard for measuring the properties of proppants that has been adopted by industry. Unless otherwise specified, properties of proppants disclosed are determined according to this standard.

One trade-off is strength and density. Increased strength is known to come with increased density. Increased density typically requires higher pressures, costs and other complications. Furthermore, low density proppants are preferred over higher density proppants, because a lower density (less than 2.5 grams per cubic centimeter) reduces pumping pressures, increases fluid velocities and keeps particles in suspension without settling out, longer. Proppant geometry is also important, with spherical particle shapes and round particle shapes being preferred over non-spherical and particles with angular features. Proppant choice and cost impacts output rate, recovery and return on investment of a well. One significant cost is transportation costs from supplier to site, and transportation cost is directly related to density, also.

Coal dust may be formed by coal mining operations and by deliberately crushing coal and/or milling the coal dust into finer and finer particles. The particle size of coal dust is typically in a range from 1 to 100 microns, although any size of coal particle may be formed by crushing, milling and sorting of coal dust. Herein, the definition of coal dust includes dust made from coal deposits and excludes synthetic carbon dust, such as synthetic graphite. Coal is abundantly available and costs less than $0.02 center per pound and is comparatively easy to crush into a dust and to grade into various sieve sizes.

Figure 1:
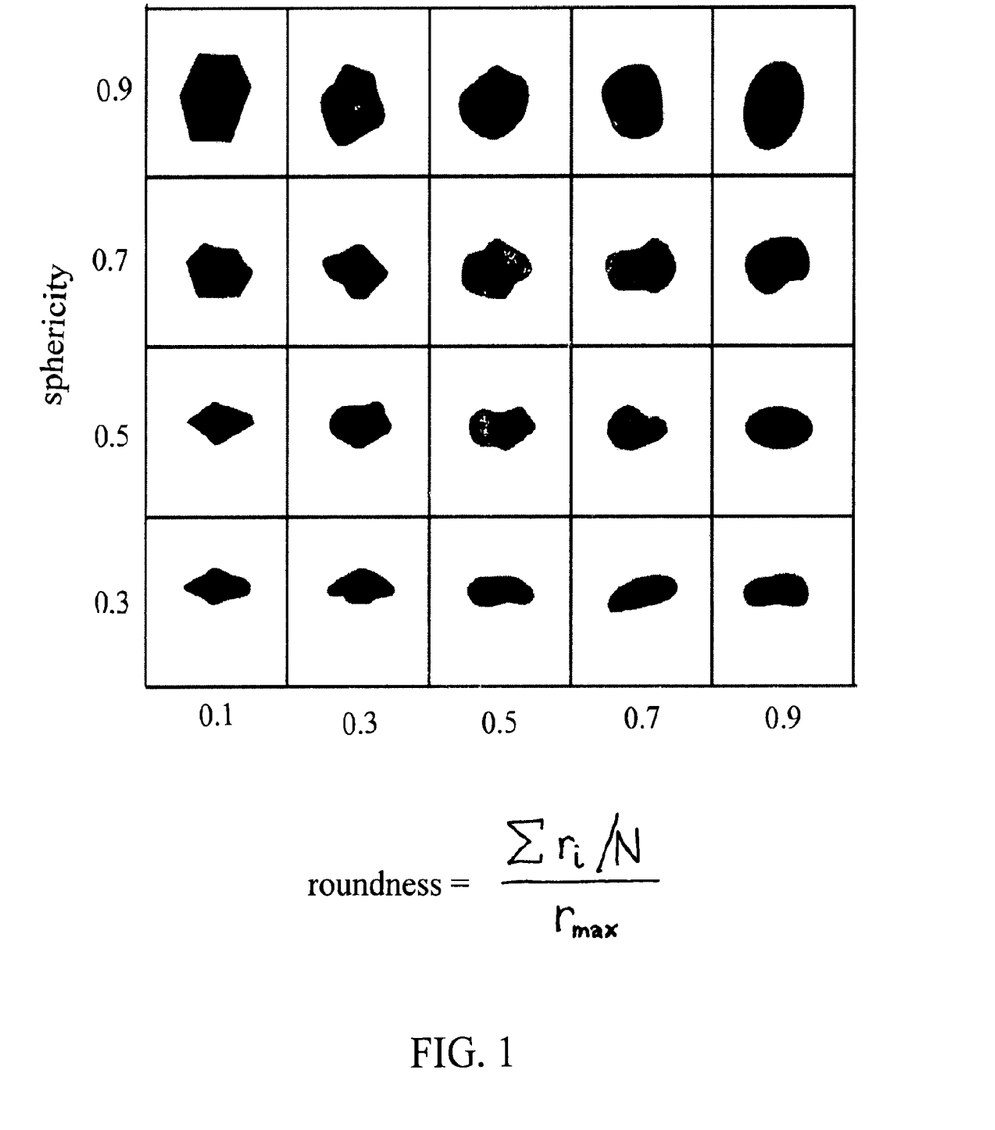
FIG. 1 discloses a prior art graph for determining sphericity and roundness, according to a standard for fracking proppants, such as fracking sand.

Sphericity is a measure of how close to a perfect sphere a particle is. Roundness is a measure of how round a projection of a particle is. The simple, classical method of quantifying sphericity and roundness is to use a standard sphericity and roundness chart, such as the prior art chart shown in FIG. 1. Preferably, a proppant has a sphericity of 0.6 or greater and a roundness of 0.6 or greater. A sphericity and/or roundness of 0.9 is very difficult to obtain for affordable proppants. To obtain this level of sphericity and roundness, the highest level, some sort of an applied coating or milling is typically required, which adds expense and may introduce other issues. Generally, a more spherical proppant has a higher crush strength and fewer fines produced during a crush strength test. The crush strength needed for a proppant generally increases as particle size decreases; however, industry prefers larger particle sizes for formations with lower closure stresses, due to an increase in the permeability around the larger particle sizes. An ideal proppant would have a crush strength, without producing fines, sufficient to withstand expected fracture closure stresses, while providing maximum recovery of hydrocarbons. However, no ideal proppant exists and all proppants have tradeoffs. Nevertheless, the industry is constantly looking for an ideal proppant that can be tailored to specific applications at a low cost. No such proppant exists at a cost that is affordable and meets or exceeds all of the properties preferred by industry. The processes described in U.S. Pat. No. 8,961,840, which are incorporated herein by reference in their entirety, are provided as examples for processing the slurry, wherein coal dust may be added in a range greater than 40% but not greater than 90% by weight of coal dust to polymer derived ceramic precursor, more preferably at least 60% and not greater than 80%. As needed, a solvent or nonsolvent, such as a fugitive nonsolvent, may be added to reduce the viscosity of the slurry during processing, for example.

SUMMARY

A proppant comprises a pyrolyzed mixture of coal dust and polymer derived ceramic composite. For example, no more than 90 percent coal dust but no less than 40 percent coal dust is mixed with a polymer or polymers, comprising the remainder of the mixture (i.e. 10 percent to 60 percent). One or more solvents and other additives, such as surfactants, binders, antimicrobials, antifungals and stabilizers may be added to the mixture to create a slurry. Then, the slurry may be further processed to produce ceramic beads comprising a plurality of ceramic constituents derived from the coal dust and polymer. In one example, the particles of coal dust are prepared from coal, such as by pulverizing, crushing and/or milling of coal into a fine dust. Then, the fine dust may be sorted by centrifuging, screening or filtering, such passing the dust through successive sieves, to be within a pre-selected, uniform particle size range (PSR). In one example, a single PSR is selected. In another example, coal dust is selected having a plurality of PSR's, such as a certain fraction having a first PSR and another fraction having a different PSR. The mixing of two or more different PSR's may be selected to create various microstructures within fired and processed beads made from the mixture of PSR's and a polymer derived ceramic matrix.

In one example, coal dust evolves volatile organics and water during pyrolytic firing of beads formed from the slurry, further reducing the density of the beads by adding porosity to the ceramic beads. The porosity may be closed cell or open cell pores within the ceramic beads. If open celled porosity, the open cells may form a continuous network of porosity only within the coal dust particles or may extend throughout the ceramic beads. The amount of polymer may be varied, such that the polymer serves either as a matrix with coal dust filler or as a binder filling the spaces between compacted coal dust particles. In one example, where the polymer derived ceramic is formed from a polymer that serves as a binder for coal dust particles, the percentage of coal dust to binder may be from 60% by weight of coal dust to total weight of the coal dust and binder to 90% by weight of coal dust to total weight of the coal dust and polymer derived ceramic binder, more preferably 65% to 75%. The properties of the polymer derived ceramic binder, the interface between the polymer derived ceramic binder and the coal dust, and the industrial requirements of the proppant determine the preferred percentage of coal dust to total weight of the coal dust and binder. In one example, an external layer of the ceramic bead is comprised of a layer of the pyrolyzed polymer derived ceramic, substantially free of coal dust particles, which may be slip layer, for example. For example, the compressive strength of a bead of pyrolyzed 100% coal dust would be negligible; however, the fine coal dust has a much higher compressive stress, when formed into a composite with a polymer derived composite. Preferably, the polymer derived composite is one that produces a bead with a sphericity and roundness greater than 0.9 and a compressive fracture strength of at least 2,000 psi, more preferably 5,000 psi, even more preferably 10,000 psi. Preferably, the coal dust is incorporated into the composite bead in a way that does not unnecessarily undermine the compressive strength of the matrix or binder. In one example, a coal dust—ceramic composite meets all of the requirements of the petroleum industry for a proppant at a cost less than 50 cents per pound, more preferably less than 25 cents per pound.

"Pyrolytic" is an adjective referring to "pyrolysis," the heating, ordinarily to very high temperatures, such as 400 to 1000 degrees centigrade, of organic materials, such as polymers, with or without other constituents and additives, to form a ceramic. Such pyrolytic heating results in an irreversible, thermochemical decomposition of the organic materials and/or additives at the elevated temperatures, in the absence of oxygen and/or any halogen, resulting in simultaneous changes in chemical composition and physical phase. Pyrolytic firing may be completed for green bodies and/or beads. In one example, green bodies are heated and at least partially dried and are then pyrolyzed. Then, the ceramic may be further mechanically and/or chemically processed to form ceramic composite beads of a preferred size and shape. For example, nearly spherical beads may be formed by milling and or processing. In one example, surface tension effects are used to drive the formation of beads having a sphericity of no less than 0.9 and a roundness no less than 0.9. In one example, substantially no alumina is present in the ceramic beads.

Particle sizes of the beads may be tailored to any practical size required by the industry. Particle sizes (PD50) may be prepared from 10 microns to 1000 microns, depending on the fracture closure stresses specified, which is an extraordinarily surprising range of particle size for the composite beads. More preferably, a range from 20 microns to 500 microns meets or exceeds all of the industry standards for closure stresses up to 2,000 psi. Even more preferably, beads with median particle sizes (pd50) from 50 microns to 200 microns meet or exceed all of the industry standards up to a fracture closure stress of 5,000 psi. It is thought, without being limiting in any way, that coal dust filler with small particle sizes, when mixed together with polymer derived ceramic materials, provides the benefits achieved by small diameter proppants, while the polymer derived ceramic, with its greater strength and sphericity provides the advantage of larger particle size. Thus, composite spherical beads with dispersed coal dust within a ceramic matrix or binder may be tailored to achieve whatever properties are needed for a proppant by the petroleum industry. Surprisingly, the porosity introduced by the coal dust and fugitive solvents and nonsolvents are less of a problem at percent additions of coal dust to the combination of polymer and coal dust greater than 40 percent by weight of coal dust to total weight of coal dust plus polymer used for the polymer derived ceramic matrix or binder. These two main constituents, not considering the mass of fugitive binders, solvents and nonsolvents, provide the constituents of the beads after pyrolyzation. In one example, a ceramic bead resistant to crushing at a specific fracture closure stress is desired, in addition to low cost and a density less than 1.8 g/cc. For example, the median density of a plurality of particles or rods may vary in a range from 1.3 g/cc to 1.8 g/cc. Depending on variations in the formulation, type of coal dust (i.e. bituminous or anthracite) and compaction pressure (or extrusion pressure of extruded rods), the density of particles may be less than 1.5 g/cc.

In one example, other nano-ceramic particles may be added or created in situ, such as particles of alumina or the like.

In one example, a ceramic bead may be tailored for the specific conditions desired by adjusting the size of coal dust particles or PSR's, the percentage of coal dust, the presence and thickness of a slip layer on the surface of the bead and the bead diameter selected for use as a proppant in a fracking fluid.

In one example, a material useful as a proppant comprises a plurality of particles or rods comprised of a pyrolyzed mixture of coal dust and polymer derived ceramic material, wherein the coal dust comprises carbon and water and is mixed with the polymer derived ceramic material to form a composite mixture, prior to pyrolysis, and the composite mixture is formed into the plurality of particles or rods; and during pyrolysis, a substantial portion of the coal dust chemically reacts, in situ, forming, after pyrolysis is complete: ceramic, graphene, nanotubes, or nanofibers or any combination of ceramic, graphene, nanotubes or nanofibers, such that the plurality of particles or rods comprise a porous ceramic composite after pyrolysis. For example, the composite mixture comprises no less than 40 wt % and no greater than 90 wt % coal dust, and the polymer derived ceramic material comprises at least the elements silicon, oxygen and carbon. In one example, the composite mixture comprises no less than 10% polymer derived ceramic material and no greater than 60% polymer derived ceramic material. The coal dust may be derived from a source of coal by pulverizing, crushing, milling or any combination of pulverizing, crushing or milling. The coal dust may first be sorted by centrifuging, screening or filtering, such that the coal dust is selected to have a uniform particle size range. The coal dust comprises a source of carbon and volatile organics and water, for example, and the carbon, volatile organics and water chemically react in situ when mixed with polymer derived ceramic material during pyrolysis. For example, the composite mixture comprises a source of iron, and while the composite mixture is being pyrolyzed, the iron acts as a catalyst for the growth of nanotubes, graphene, nanofibers or any combination of nanotubes, graphene or nanofibers. In one example, an external layer of pyrolyzed polymer derived ceramic material, such as a slip layer, may be substantially free of coal dust particles. A sphericity of a plurality of particles may be greater than 0.9, for example. A compressive fracture strength of the plurality of particles may be at least 2000 psi. In one example, the compressive fracture strength of the plurality of particles is at least 5000 psi. The compressive fracture strength of the plurality of particles may be at least 10,000 psi. The particle size (PD50) of the plurality of particles may be in a range from 10 microns to 1000 microns. In one example, the particle size (PD50) of the plurality of particles is in a range from 20 microns to 500 microns. Alternatively, the plurality of particles may be selected with a median particle size (PD50) from 50 microns to 200 microns and may exhibit a compressive fracture strength of at least 5000 psi. The median density of the plurality of particles may be less than 1.5 grams per cubic centimeter, and the plurality of particles each may have a ceramic shell substantially devoid of coal dust. For example, the plurality of particles or rods may have a compressive fracture strength in a range from 6000 psi to 20,000 psi.

In one example, the ceramic shell is substantially nonporous and the core comprises a cancellous ceramic network, such that the particles or rods appear to mimic a bone-like cancellous structure (except on a smaller scale in some cases). A weight percentage of the weight of coal dust to the weight of the mixture of coal dust and polymer derived ceramic may be selected in a range from 60 wt % to 80 wt % within a core portion. The coal dust may be pulverized to less than 3 microns, for example.

In one example, a material useful as a proppant comprises: a plurality of extruded, elongated rods having a rod length much greater than a rod diameter, each of the rods being comprised of a mixture of coal dust and polymer derived ceramic material, when initially extruded prior to pyrolysis, wherein the coal dust comprises carbon and water and is mixed with the polymer derived ceramic material to form a composite mixture, the composite mixture being extruded under pressure into rods; and during pyrolysis, a substantial portion of the coal dust chemically reacts, in situ, forming, after pyrolysis is complete: ceramic, graphene, nanotubes, or nanofibers or any combination of ceramic, graphene, nanotubes or nanofibers, such that the plurality of rods comprise a porous ceramic composite after pyrolysis. For example, the rods each have a core disposed within an outer shell having a higher density than the core, and substantially all of the coal dust is chemically reacted in at least a portion of the core, such that the portion of the core is a ceramic substantially devoid of unreacted coal dust.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

In one example, more than one-half of the composite, by weight, is comprised of coal dust, and the particle size (pd50) of the coal dust particles is at least 10 times smaller than the composite bead particle size, more preferably 20 times smaller, even more preferably 50 times smaller, yet more preferably 100 times smaller. For example, the median particle size (pd50) of the coal dust may be selected in a range from 10 to 200 microns, and median bead size may be selected in a range from 100 to 2000 microns. A resulting fracture closure resistance of a ceramic bead comprised of a composite of the coal dust and a polymer derived ceramic may be selected in a range from 2,000 psi to 20,000 psi. In one example, a composite ceramic bead is formed with a coal dust and ceramic core and a ceramic shell, substantially devoid of coal dust, and the ceramic bead may have a resistance to fracture stresses between 6,000 psi and 20,000 psi. When pyrolyzed, the ceramic shell binds to the ceramic portion of the core and forms a hardened, nonporous shell, and the core comprises coal dust, porosity and a cancellous ceramic network within a compact shell, mimicking the structure of bone, for example. The core of the bead may be processed and at least partially dried and heated, such as at a temperature up to 400 degrees centigrade in a spray drying chamber. Then, the core may be further processed by mixing with a polymer, and the core may be coated with a slip layer of a polymer. Then, the slip layer of the polymer, which may be referred to as a "slip layer," herein, may produce a polymer derived ceramic, when the core and slip layer are pyrolyzed. The slip layer may be the same polymer derived ceramic as the polymer derived ceramic phase in the composite core. Alternatively, a different polymer derived ceramic may be selected for the slip layer. The thickness of the shell may be tailored by controlling the viscosity of the polymer when mixed with a plurality of the cores and by the choice of processing steps following mixing. Slip layers may be added and dried repeatedly in an automated process that provides a layered shell or by a coating with an atomized layer of polymer during coating of a fluidized collection of beads suspended within a fluid stream, for example. Collectively, a plurality of slip layers or a built-up slip layer, over time, may form a single ceramic shell when pyrolyzed or a plurality of ceramic shells may be tailored for particular attributes, such as resistance to fracture closure stresses and/or hardness and/or toughness. For example, the cores may be separated into individual beads, such as by spray drying or emulsion forming or any other process capable of forming bead-like core particles, prior to pyrolyzing the beads at a pyrolyzation temperature, such as 400 degrees centigrade or greater, more preferably at a temperature selected in a range from 600 degrees centigrade to 1000 degrees centigrade, forming a solid or nearly solid outer shell on a composite core comprising coal dust/polymer derived ceramic, wherein the core may contain substantial porosity, without unnecessarily adversely affecting the crush strength or fracture compression stress resistance of the ceramic composite proppant.

A fraction or percentage of coal dust to coal dust and polymer, by weight, may be selected for the composite core. For example, a fraction of coal dust may be selected in a range from about nine-tenths to about six-tenths of the total coal dust and polymer, by weight, more preferably the percentage of coal dust to combined coal dust and polymer is selected to be from 80% to 60% coal dust by weight, within the core, prior to heating the core, resulting in a significant reduction in density and cost of the core material. The shell may comprise a thin ceramic film, such as a 0.1 micron film or a thicker coating may be applied to the core, greater than 0.1 microns. In one example, a thickness of the slip layer coating of a pyrolyzed ceramic bead is selected from 1% to 20% of the particle's effective diameter, even more preferably from 5% to 15% of the particles' effective spherical diameters. The thickness of the ceramic coating may be tailored as a trade-off between cost and fracture closure strength resistance of the composite ceramic beads, for example.

In one example, the ceramic beads comprise porosity, further reducing the density below the density of a mixture of the carbon and polymer derived ceramic materials. It is believed, without being limiting in any way, that increasing porosity will decrease the compressive strength of the ceramic beads. However, porosity at the core of a ceramic bead has less effect on the crush strength of a ceramic composite bead than porosity at the outer shell. Thus, coal dust-polymer derived ceramic beads may be tailored having a wide range of resistance to crushing by fracture closure stresses, cost, sphericity/roundness and density.

For example, a roundness or sphericity of the ceramic beads is at least 0.9 after processing of the beads. A cost of the beads may be less than one-half U.S. dollar, more preferably less than 0.25 cents per pound. For example, the ceramic beads, when added to a proppant, are capable of withstanding closure pressures of at least 6000 pounds per square inch (psi), more preferably at least 7000 psi, even more preferably at least 8000 psi, yet more preferably at least 10,000 psi. In one example, the specific gravity (compared to water) is no greater than 2.6, more preferable no greater than 2.5, even more preferably no greater than 1.5, still more preferably about 1.0, such that the ceramic beads remain suspended in and carried along with a proppant fluid having a density similar to water, and at a concentration such that the viscosity of the fracking fluid is not unreasonably elevated by the addition of the proppant.

Figure 2:
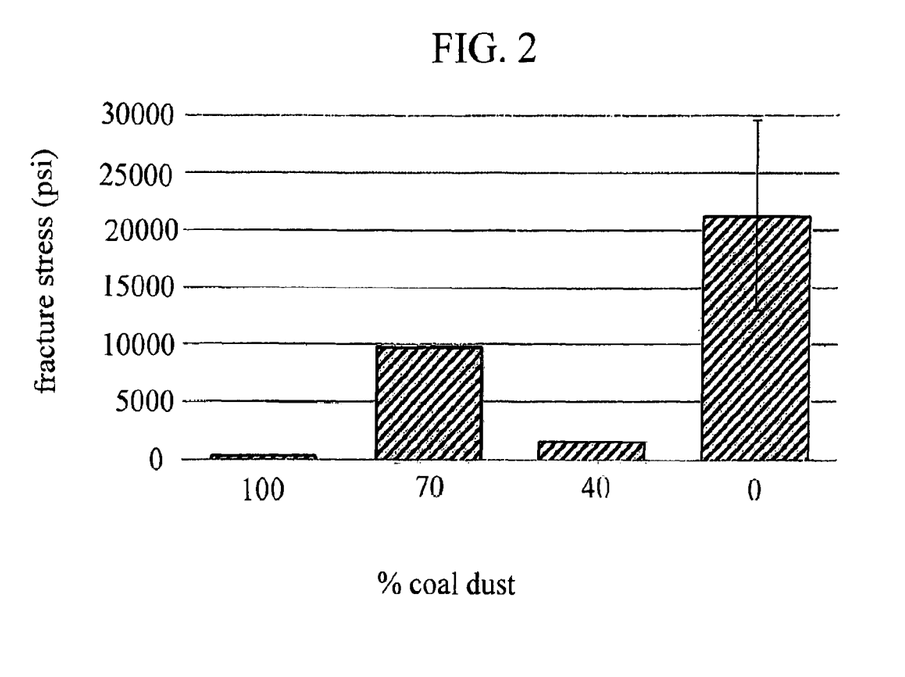
FIG. 2 is a graph showing data for fracture stress resistance for various coal dust compositions in coal dust—polymer derived ceramic composite beads.

For example, a polymer derived ceramic may comprise a polysiloxane, polysilazane, polyborosiloxane, polycarbosiloxane, polyborosilane, polycarbosilanes and combinations of any two or more of these, with or without other additives. In one example, a precursor for the polymer derived ceramic is mixed with a low-cost filler, such as coal dust. In one example, a critical range for the low-cost filler, such as coal dust, comprises a fraction of coal dust to polymer derived ceramic in a range from no greater than 9 parts coal dust to 1 part polymer derived ceramic to no less than 6.5 parts coal dust to 3.5 parts polymer derived ceramic, by mass. Preferably, the fraction of coal dust is greater than 6 parts coal dust to 4 parts polymer derived ceramic. Surprisingly, a core having greater than 6 parts coal dust to 4 parts polymer may have a greater fracture resistance than a core with less coal dust, as shown in FIG. 2, for example.

For example, a carbon-based, organic material, such as a source of coal, may be pulverized into a dust. The coal dust may be separated into different particle sizes, such as by passing the coal dust through a sieve or sieves. Sequentially sieving the coal dust through a series of sieves gives an indication of the coal dust particle size, for example, a No. 270 sieve has openings of 53 microns, a No. 325 sieve has openings of 44 microns, and a No. 400 sieve has openings of 37 microns. Therefore, each successive sieve traps particles larger than the opening size through the sieve. If the particles are not spherical, then the sieve opening usually reflects the second maximum dimension of the particles, i.e. not the length but the width of a particle. For example, coal dust particles having an equivalent diameter of 40 microns might pass through a No. 400 sieve, if non-spherically elongated in one direction and less than 37 microns in its other dimensions. Also, a sieve may be used for screening out larger particles or agglomerations of particles prior to mixing with a polymer. Coal dust that passes through a 37 micron sieve may be utilized in composite beads or composite bead cores having equivalent diameters from 150 microns and greater, more preferably 200 microns to 2000 microns, even more preferably 400 microns to 800 microns, for example. Ultracentrifuges and other techniques may be used to separate out particles smaller than sieves with the smallest available holes, for example, and other techniques may be used to characterize particles, even down to a few microns. Synthetic forms of carbon may be utilized (usually at a higher cost) if available. For example, graphite powders may be available already sifted to very small particle sizes. The type of carbon powder utilized may affect the porosity and density of the core and may have an adverse or beneficial impact on the cost, fracture stress resistance, sphericity/roundness and density of carbon-polymer derived ceramic beads.

In one example, a coal dust may be mixed with a polymer, such as a polymer to ceramic material. For example, a polymer to ceramic material may be selected from Starfire Systems, such as an SPR212, which forms a silica carbide ceramic upon heating in a pyrolytic process. Alternatively, a polymer may be selected to form other ceramic materials including a metal or rare earth and oxygen, carbon, nitrogen, boron or combinations of oxygen, carbon, nitrogen and boron, for example. For example, silicon may form a ceramic with carbon (SiC) or with oxygen (SiO) or with carbon and oxygen (SiOC). Ceramics may be comprised of oxides, carbides, borides, nitrides and the like. The resulting ceramic and the properties of the ceramic will depend, significantly, on the processing used to produce the ceramic or ceramic composite beads.

In one example, a nonsolvent, such as water or other non-dissolving fluid, is added to form a slurry of the coal dust and polymer, and the polymer may be dissolved in a solvent or may be present as polymer particles or as a liquid polymer at the temperature of the bead formation. For example, a slurry may be formed into small droplets, which partially cure to form beads, such as by drying and/or heating the beads as the beads are formed. For example, beads with mean particle sizes selected in a range from 100 microns to 2 millimeters may be formed having a sphericity of 0.9 or greater. The partially cured beads may be fully solid or may have porosity from volatilization of a solvent, a reaction product or a nonsolvent. In one example, the amount of solvent or nonsolvent is selected to control the amount of porosity in the bead, tailoring the density and crush strength of the bead. In one example, the polymer may be dissolved or partially dissolved in a solvent, and the polymer solvent may be a nonsolvent to the coal dust. Alternatively, an additional nonsolvent may be added to reduce the viscosity of the mixture of solvated polymer and coal dust. For example, ceramic beads may be formed having bead sizes from 30 to 100 microns, if coal dust size is selected to be no greater than 3 microns. More preferably, median bead particle size (pd50) is selected to be in a range of 50 to 2000 microns, depending on the specifications required by the finking industry. In one example, a 30 micron bead is formed by mixing very fine coal dust, 3 microns or smaller, with a polymer used for creating a polymer derived ceramic and a solvent. The mixture is sprayed through a nozzle into a spray dryer forming nearly spherical beads. The beads are pyrolyzed, such as at a pyrolysis temperature of 1000 degrees centigrade and in a non-oxidizing atmosphere, wherein an irreversible chemical reaction occurs. Hydrates, water vapor and volatile organic compounds are volatilized from the coal dust and polymer of the bead during hearting, drying and pyrolysis, resulting in a porosity in the core of the bead, reducing the density of the bead to less than 1.5 g/cc, in one example, more preferably less than 1.2 g/cc. In one example, the mean sphericity is no less than 0.9 and the mean roundness is no less than 0.9. The sphericity of coal dust is not particularly important to the sphericity of a composite bead made from a plurality of coal dust particles and a polymer derived ceramic. Preferably, each ceramic bead comprises at least 10 coal dust particles and has a sphericity and roundness no less than 0.9.

In one example, a process includes a spray dryer. A spray drying process may comprise a nozzle, such as a sonic, acoustic and/or electrostatic nozzle. The orifice and type of the nozzle may be selected to output particles of a defined size range and sphericity/roundness. In some nozzles, mixing may occur at or immediately adjacent to the nozzle, allowing the coal dust to be fed into one inlet and the polymer at a second inlet. The composite beads are emitted from the nozzle upon mixing of the two feed stocks. For example, the temperature and atmosphere in a drying chamber may be controlled to cure the beads, partially or completely, by conventional heating elements or electromagnetic waves, for example. Waves of any frequency may be provided to impart heat or to directly cure the polymer, such as infrared waves, microwaves, ultraviolet light, x-rays or the like. The resident time in the drying chamber may be shorter or longer depending on the rate and degree of curing and drying desired. Pyrolysis may occur in the drying chamber or may be completed after the beads are removed from the chamber or in a subsequent chamber, in a continuous or batch process. Alternatively, the beads may be defined as having a core distinct from the outer layer or layers of the beads, by further processing. For example, the core may be mixed with a polymer, such as a polymer derived ceramic polymer, which may be the same or different than the polymer derived ceramic polymer of the core. The core may be pyrolyzed (i) to completion, (ii) for the first time or (iii) for a second time, after being dried and coated with the polymer derived ceramic layer. In one example, the core is partially dried, and would be tacky to the touch, when a slip layer of a polymer for an external polymer derived ceramic coating is applied to the core. Alternatively, after being coated, the bead may be processed through a nozzle and/or a drying chamber and/or an emulsion to separate the beads and cure the coating, prior to or at the same time as the beads are being pyrolyzed.

FIG. 2 shows a fracture stress comparison for bead cores for four different percentages of coal dust in the core. The 0% coal dust is data derived from polymer derived ceramic beads, and the error bar shows a range of fracture stress from low to high based on choice of polymer and processing parameters. The fracture stress of the 70% coal dust—polymer derived ceramic was especially surprising and unexpected, almost achieving a 10,000 psi fracture stress for a core. The density of polymer derived ceramic is about 2 g/cc. The density of coal dust is about 0.6 g/cc, depending on the type of coal, and bulk density of coal may be as high as 0.93 g/cc. However, a pyrolyzed mixture of coal and polymer derived ceramic may have a substantially different density than the constituents, due to volatile gases and processing differences. The data points in FIG. 2 are for beads having a density of 2.0 to 2.1 g/cc (0% coal dust) and a bulk density of 1.27 g/cc (70% coal dust) was measured from a rod formed of compacted beads that was then pyrolyzed, by measuring the mass and volume of the rod; and a bead made from only coal dust is assumed to have a density less than 0.93 g/cc (highest bulk density for coal) and probably much less. The density of the beads with 40% coal dust, which were made by emulsion processing, has not been measured, yet. The density is probably less than 1.27 g/cc, but the density difference cannot account for the significant difference in comparative fracture stress resistance. Ordinarily, one would predict that both the density and comparative fracture stress would be inversely proportional to the percentage of coal dust; however, the data shows a substantial variation in comparative fracture stress with the choice of polymer precursor, percentage coal and processing parameters for a bead core that defies conventional assumptions. This provides opportunities for tailoring properties of proppant beads made of a composite of coal dust and polymer derived ceramic, because the data for 70% coal dust has a very favorable density, fracture stress resistance, sphericity, roundness and cost that make it attractive as a proppant, meeting or exceeding industry requirements.

In one example, the 70% coal dust—30% polymer derived ceramic composite bead was formed by mixing together 7 parts by weight of coal dust (approximate particle size of 3-5 microns) with 3 parts by weight of a polymer derived ceramic precursor, such as an SPR212 or other polymer capable of being pyrolyzed to form a ceramic. Additionally, chloroform, a solvent for the polymer, was added at 1 part chloroform to 1 part of the mixture by volume, producing a slurry. The slurry was emulsified to produce beads that were partially cured at a temperature of 50 degrees C. for 30 minutes. The beads were transferred to a retort furnace under an atmosphere of dry nitrogen for 600 minutes at room temperature and ramped to 1000 degrees centigrade over ten hours, causing pyrolysis of the polymer to form a ceramic. The composite bead particle size was estimated to be 400 microns. Without being limiting in any way, it is believed that the polymer derived ceramic acted as a binder for the coal dust particles. For example, the composite ceramic beads in the example disclosed in FIG. 2 are likely to meet or exceed industry requirements for a proppant.

In another example, a 40% coal dust—60% polymer derived ceramic composite bead was formed by mixing 4 parts by weight of coal dust (approximate particle size of 3-5 microns) with 6 parts by weight of a polymer derived ceramic precursor, such as an SPR212 or other polymer capable of being pyrolyzed to form a ceramic. Additionally, chloroform, a solvent for the polymer, was added at 1 part to 2 parts of the mixture by (weight/volume), producing a slurry. The slurry was emulsified produce beads that were (dried/partially cured) at a temperature of 50 degrees C. for 30 minutes. The beads were transferred to a retort furnace under an atmosphere of dry nitrogen for 600 minutes at room temperature and ramped to 1000 degrees centigrade over ten hours, causing pyrolysis of the polymer to form a ceramic. The composite bead particle size was estimated to be 400 microns. Without being limiting in any way, it is believed that the polymer to ceramic material comprised a matrix, and the coal dust may have introduced defects and voids into the matrix, such as by outgassing from the coal dust and evaporation of (solvent/nonsolvent) during pyrolysis. In the example show in FIG. 2, the resulting composite beads failed to meet industry requirements for a proppant.

Before conducting the experiments, one would have assumed that any process and any percentage of coal dust less than 90% coal dust could have at least met the industry standards for a proppant, but the results of experiments have shown that less coal dust does not necessarily result in a higher comparative fracture stress, which is one of the most critical requirements that any fracking proppant must meet.

More generally, proppants may be made by a variety of processes, provided that the polymer to ceramic phase acts, preferably, as a binder between coal dust particles, and with a range of coal dust percentages, provided that the coal dust particles and any porosity introduced during processing do not become defect sites undermining the composite bead's resistance to fracture stress. Whether or not such defects exist will depend on processing conditions, coal dust particle size, solvent/nonsolvent characteristics, the fracture stress and toughness of the polymer to ceramic phase and whether the evolution of a vapor phase during pyrolysis adds porosity to the composite beads.

Figure 3:
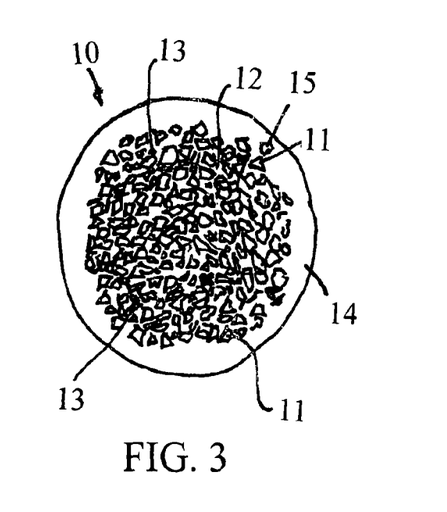
FIG. 3 illustrates a cross section of an example having a core and a coating, wherein the core comprises coal dust particles and the coating is substantially free of coal dust particles.

FIG. 3 illustrates, schematically, an example of a composite ceramic bead comprising a plurality of coal dust particles 11, which may be substantially non-round and non-spherical, a polymer to ceramic phase 12, which may act as a binder, a plurality of pores 13, forming closed porosity or interconnected, open celled porosity, within the polymer to ceramic phase, and a coating 14, which may be a slip layer, substantially free of coal dust. As shown, the core coal dust—polymer to ceramic portion of a bead may be non-spherical and non-round, and the slip layer may increase the sphericity and roundness of the bead. Also, the bead core may have a substantially lower fracture stress than the bead shell, the shell providing the greatest contribution to fracture stress resistance of the bead. Thus, the bead may comprise a core including up to 90% by weight coal dust to polymer derived ceramic, while the composite bead meets or exceeds industry requirements for a proppant. The representation in FIG. 3 shows a coal dust particle that separated from the core and found its way into the shell; however, the presence of an isolated coal dust particle 15 or even several coal dust particles within the slip layer has little effect on the fracture stress resistance of the composite bead, provided the slip layer is substantially free of coal dust, meaning that the slip layer comprises less than 10% by weight of coal dust to polymer derived ceramic and coal dust particles do not extend beyond the surface of the polymer to ceramic slip layer. The addition of a slip layer 14 may improve, substantially, the sphericity, roundness and fracture stress resistance of a composite bead, even if a composite core of the bead would not have met industry requirements for a proppant.

Figure 4:
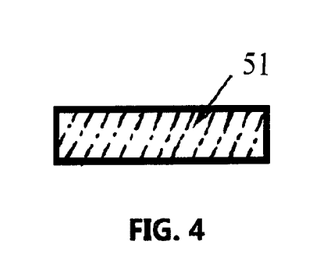
FIG. 4 illustrates an example of a rod.
Figure 5:
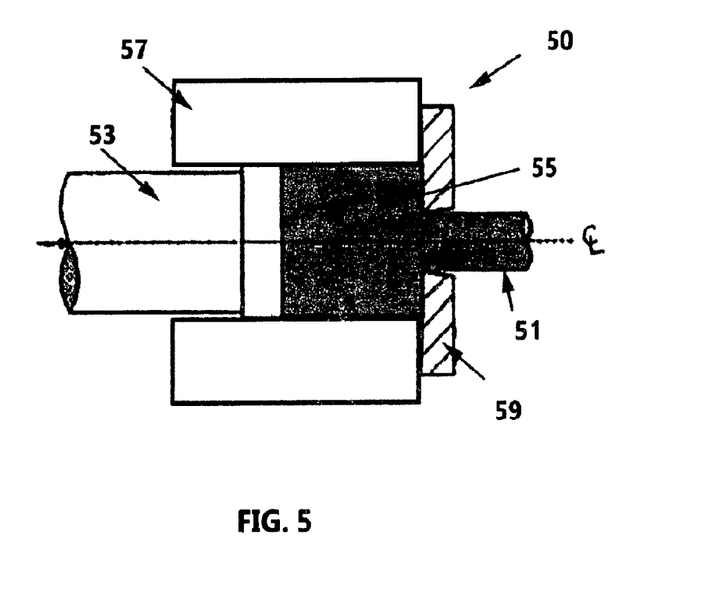
FIG. 5 illustrates an example of an extrusion process.

In one alternative example, a proppant is formed that has a rod-like morphology, as illustrated in FIG. 4. For example, bituminous coal may be ground in a mortar and pestle with a particle distribution, such as from 1-50 microns. The coal may be mixed with silica-oxy-carbide PDC resin or the like, at room temperature, for example. Then, the mixture may be extruded through a press 50, such as a Carver press, hand press or hydraulic press, for example. For example, a sleeve fixture 57 with an inner diameter may be utilized for the extrusion die. For example, a rod 55 may be fit into the sleeve fixture 57. The rod 55 may be advanced into the sleeve fixture 57 to a plate 59, such as by utilizing a threadingly engaged screw mechanism or a hydraulic press, and a piston 53 may be used to extrude the mixture in the rod 55 out through a hole in the plate 59. The hole may have tapered sides, defined by the wall of the plate 59. The extruded rod 51 may be cut to length and may be pyrolyzed. In one process, pyrolization is completed in a nitrogen atmosphere and temperature may be ramped to 1000° C. to pyrolyze the rods.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A material useful as a proppant comprises:
a plurality of particles or rods comprised of a pyrolyzed mixture of coal dust and polymer derived ceramic material, wherein the coal dust is derived from a source of coal, is comprised of carbon, volatile organics and water and is mixed with the polymer derived ceramic material to form a composite mixture, prior to pyrolysis, the composite mixture comprising no less than 40 wt % coal dust, and the composite mixture forms a core of the plurality of particles or rods prior to pyrolysis, the core being processed and at least partially dried and heated at a temperature up to 400 degrees centigrade; and
a slip layer on a surface of the core, wherein, during pyrolysis, a substantial portion of the coal dust chemically reacts, in situ, forming, after pyrolysis is complete, ceramic, graphene, nanotubes, or nanofibers or any combination of ceramic, graphene, nanotubes or nanofibers in the core, such that the core comprises a porous ceramic composite after pyrolysis and the slip layer forms a substantially nonporous ceramic layer substantially free of coal dust particles.

2. The material of claim 1, wherein the composite mixture comprises no less than 40 wt % and no greater than 90 wt % coal dust, and the polymer derived ceramic material comprises at least the elements silicon, oxygen and carbon.

3. The material of claim 2, wherein the composite mixture comprises no less than 10 wt % polymer derived ceramic material and no greater than 60 wt % polymer derived ceramic material.

4. The material of claim 1, wherein the coal dust is derived from a source of coal by pulverizing, crushing, milling or any combination of pulverizing, crushing or milling.

5. The material of claim 1, wherein the coal dust is first sorted by centrifuging, screening or filtering, such that the coal dust is selected to have a uniform particle size range.

6. The material of claim 1, wherein the composite mixture comprises a source of iron, and while the composite mixture is being pyrolyzed, the iron acts as a catalyst for the growth of nanotubes, graphene, nanofibers or any combination of nanotubes, graphene or nanofibers.

7. The material of claim 6, further comprising an external layer of pyrolyzed polymer derived ceramic material substantially free of coal dust particles.

8. The material of claim 1, wherein the sphericity of the plurality of particles is greater than 0.9.

9. The material of claim 8, wherein the compressive fracture strength of the plurality of particles is at least 2000 psi.

10. The material of claim 8, wherein the compressive fracture strength of the plurality of particles is at least 5000 psi.

11. The material of claim 8, wherein the compressive fracture strength of the plurality of particles is at least 10,000 psi.

12. The material of claim 1, wherein the particle size (PD50) of the plurality of particles is in a range from 10 microns to 1000 microns.

13. The material of claim 1, wherein the particle size (PD50) of the plurality of particles is in a range from 20 microns to 500 microns.

14. The material of claim 13, wherein the compressive fracture strength of the plurality of particles is at least 2000 psi.

15. The material of claim 14, wherein the plurality of particles are selected with a median particle size (PD50) from 50 microns to 200 microns and exhibit a compressive fracture strength of at least 5000 psi.

16. The material of claim 15, wherein the median density of the plurality of particles, after pyrolysis is no less than 1.3 g/cc and no greater than 1.8 grams per cubic centimeter.

17. The material of claim 1, wherein the ceramic layer has a compressive fracture strength in a range from 6000 psi to 20,000 psi.

18. The material of claim 17, wherein the ceramic layer is substantially nonporous and the core comprises a cancellous ceramic network.

19. The material of claim 1, wherein the weight percentage of the weight of coal dust to the weight of the mixture of coal dust and polymer derived ceramic material is selected in a range from 60 wt % to 80 wt % within a core portion of the proppant.

20. The material of claim 1, wherein the coal dust is pulverized to less than 3 microns.

21. The materials of claim 1, wherein the median density of the plurality of particles is less than 1.5 g/cc.

22. A material useful as a proppant comprises:
a plurality of extruded, elongated rods having a rod length much greater than a rod diameter, each of the rods being comprised of a mixture of coal dust and polymer derived ceramic material, when initially extruded prior to pyrolysis, wherein the coal dust is derived from a source of coal, is comprised of carbon, volatile organics and water, and is mixed with the polymer derived ceramic material to form a composite mixture, the composite mixture being extruded under pressure into rods;
the rods being processed and at least partially dried and heated at a temperature up to 400 degrees centigrade before a slip layer is disposed on a surface of the rods, and during pyrolysis, a substantial portion of the coal dust chemically reacts, in situ, forming, after pyrolysis is complete, ceramic, graphene, nanotubes, or nanofibers or any combination of ceramic, graphene, nanotubes or nanofibers, such that the plurality of rods comprise a porous ceramic composite after pyrolysis, and the slip layer forms a ceramic shell of a substantially nonporous ceramic material, substantially free of coal dust.

23. The material of claim 22, wherein substantially all of the coal dust is chemically reacted in at least a portion of the core, such that the portion of the core is a ceramic substantially devoid of unreacted coal dust.

* * * * *